(12) United States Patent
Schwarz

(10) Patent No.: US 6,278,083 B1
(45) Date of Patent: Aug. 21, 2001

(54) MOTOR VEHICLE HEATING OR AIR CONDITIONING UNIT

(75) Inventor: Stefan Schwarz, Orion Township, MI (US)

(73) Assignee: Valeo Climate Control, Inc., Auburn Hills, MI (US)

( * ) Notice: Subject to any disclaimer, the term of this patent is extended or adjusted under 35 U.S.C. 154(b) by 0 days.

(21) Appl. No.: 09/480,408

(22) Filed: Jan. 11, 2000

(51) Int. Cl.[7] ........................................... B60L 1/02
(52) U.S. Cl. ............................................... 219/202
(58) Field of Search .............................. 219/202; 165/41, 165/42; 237/28; 454/107, 115, 126

(56) References Cited

U.S. PATENT DOCUMENTS

| 4,232,211 | * | 11/1980 | Hill . | |
|---|---|---|---|---|
| 4,459,466 | * | 7/1984 | Nakagawa et al. | 392/307 |
| 4,963,716 | * | 10/1990 | Van Den Elst et al. | 219/202 |
| 5,279,459 | * | 1/1994 | Single, II | 237/2 A |
| 5,478,274 | * | 12/1995 | Danieau . | |
| 5,505,251 | * | 4/1996 | Sarbach | 165/202 |
| 5,571,432 | * | 11/1996 | Sarbach | 219/202 |
| 6,002,105 | * | 12/1999 | Tamada . | |
| 6,166,351 | * | 12/2000 | Yamamoto | 219/202 |

* cited by examiner

Primary Examiner—Teresa Walberg
Assistant Examiner—Vinod D Patel
(74) Attorney, Agent, or Firm—Morgan & Finnegan, LLP

(57) ABSTRACT

A lateral heating or air conditioning unit has an electric heating device downstream of the heater core, spaced from it and in the mouth of the hot passage. Separate blend doors are disposed in each of the hot and cold passages.

The electric heater device is flush with the opening of the hot air passageway into the mixing chamber so as to prevent air flow disturbances.

13 Claims, 2 Drawing Sheets

MOTOR VEHICLE HEATING OR AIR CONDITIONING UNIT

FIELD OF THE INVENTION

The present invention relates to a heating unit for a motor vehicle, and to an air conditioning unit for a motor vehicle.

BACKGROUND OF THE INVENTION

Heating and air conditioning units for vehicles are commonplace in the art. Two main configurations are used, one being the centre stack configuration and one the lateral configuration. In the centre stack configuration, a heater core is close to transverse an input duct and in the lateral configuration, the heater core is close to parallel to the axis of the input duct.

Many such units have an input air duct of a relatively large cross-section. The input air duct has a divider which defines two passageways, one of which contains a heat exchanger receiving engine coolant and the other of which contains no such heat exchanger. The two passageways combine again downstream of the heat exchanger in a mixing space and the air from the mixing space is distributed to different locations in the vehicle. One or more flow control devices is associated with the passageways, for example at the point of division of the input air duct so as to control the proportion of air flowing through the heat exchanger by comparison with the flow of air direct from the input air duct to the mixing space. The flow control devices are usually capable of substantially closing the air passages so that either all air flow in the input duct passes through the heat exchanger or all air flow in the input duct passes through the direct passageway to the mixing space. Intermediate positions allow proportion control.

It is possible to use a single door-type flow control device pivoting about the division point of the input air duct so that the door can be selectively across the heat exchange passageway, across the direct passageway or intermediate the two positions. Such single door type arrangements can however make the heating/air conditioning unit unduly large and also affect flow performance. It is alternatively possible to arrange separate doors across each of the passageways; where the doors are centrally pivoted in a butterfly formation, space may be saved.

Modern power units may not provide coolant which reaches the high temperatures that were formerly available and would be advantageous in supplying to the heat exchanger discussed above, known hereinafter as a heater core. Another problem arises during the warm up period of the power unit as during this time the coolant may provide little or no heating effect in the heater core.

It has therefore been proposed to additionally provide an electric heating device in the heating unit, this typically being a positive temperature coefficient (PTC) heating device.

Inclusion of such heating devices has a disadvantage in that it may adversely affect the flow of air through the heater core, and may also substantially increase the space occupied by the heating unit.

Object of the Invention

It is therefore an object of the present invention to address the difficulties of the prior art.

SUMMARY OF THE INVENTION

According to a first aspect of the present invention there is provided a vehicle heating device comprising an inlet duct, and first and second passageways, said first and second passageways extending laterally from said inlet duct to a common mixing zone, a heater core, said heater core being disposed in the first passageway, said heater core being substantially laterally disposed with respect to said inlet duct, said first passageway having a mouth defined by two opposing wall portions, said mouth entering the common mixing zone, an electric heater disposed across said mouth and spaced from said heater core, a first blend door disposed in said first passageway, and a second blend door disposed in said second passageway.

Advantageously said electric heater has a first face disposed proximate said heater core and second face disposed remote from said heater core, said second face being substantially flush with said mouth and wherein an air flow in said second passage is substantially parallel to said second face.

Conveniently the device further comprises control devices for moving the blend doors between fully closed positions in which each blend door closes its respective passageway and fully opened positions in which each blend door is substantially aligned with the respective passageway.

Conveniently each blend door comprises two opposed wings mutually disposed at an obtuse angle to provide direction of air flow when the respective door is fully open.

Preferably the device further comprises an evaporator, said evaporator being disposed in said inlet duct to provide an air conditioning device.

Advantageously the device further comprises a flow separating device disposed in said inlet duct, whereby said inlet divides into first and second passageways.

Conveniently an extremity of said flow separating device forms one of said wall portions defining said mouth.

BRIEF DESCRIPTION OF THE DRAWINGS

A preferred embodiment of the invention will now be described, by way of example only, with reference to the accompanying drawings in which.

DESCRIPTION OF THE PREFERRED EMBODIMENT

Figure 1:
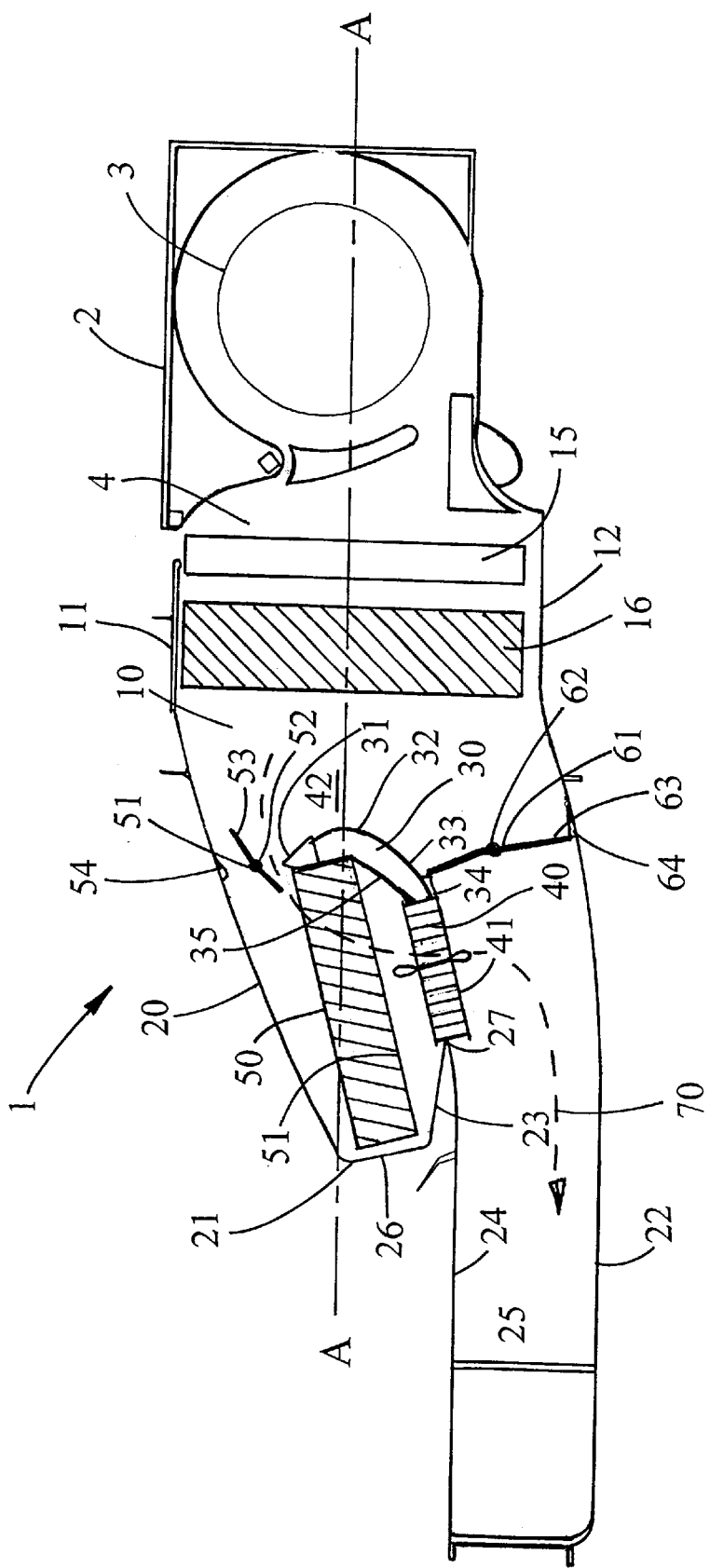
FIG. 1 shows a schematic cross-sectional view through a heating or air conditioning device in accordance with the invention, in a fully hot position.

In the various figures, like reference numerals refer to like parts.

Referring first to FIG. 1, an air conditioning unit 1 has an input blower 2 of the centrifugal type, with a fan wheel 3 and providing an outlet 4. The outlet 4 is in connection with a mouth of air inlet duct 10, defined in part by a first wall portion 11 and an opposing second wall portion 12. At the opening of the mouth of the duct 10 is a filter 15 followed by a evaporator 16.

As known to those skilled in the art, the evaporator 16 is supplied with a cooling fluid whereby air downstream of the evaporator is cooled.

The device described here is an air conditioning unit, hence the evaporator. Those skilled in the art will realise that omission of the evaporator would instead provide a heating/ventilation unit due to the absence of the ability to cool.

The first and second wall portions 11, 12 are, as shown in FIG. 1, substantially parallel in the mouth region of the inlet duct 10. However, upper, as shown in FIG. 1, wall portion 11 passes via a transition curve into a straight region 20 which tapers inward to a point 21 substantially on the axis A of the mouth region of the inlet duct 10. The lower, as shown in FIG. 1, wall portion 12 also has a transition curve downwardly, diverging from the axis A before gently curving back to a straight region 22 substantially parallel to the axis A.

From the point 21, the first wall portion makes a sharp transition to a portion 26 directed generally at right angles to the axis A before turning sharply back to a return portion 23 directed towards a lower edge, as shown, of the evaporator 16. At the end 27 of the return portion, the first wall portion turns sharply back on itself to an outlet region 24 generally parallel to axis A.

A flow separating wall 30 is disposed within the air inlet duct 10. The flow separating wall has a first extremity 31 which is slightly above the axis A and defines a shape which is generally convex towards the mouth of the air inlet duct 10, passing from a point 32 nearest to the mouth and disposed on the axis A via a flow-directing region 33 to a second extremity 34. The second extremity 34 is spaced from the innermost extremity 27 of the return portion 23 to define a mouth for housing an electric heating device 40, such as a PTC heating device. The first extremity 31 of the flow separating wall 30 and the point 21 on the first wall portion 11 define a spacing receiving a heater bore 50. As will be seen in FIG. 1, the heater core and the electric heating device are substantially parallel to one another and spaced apart. The electric heating device is substantially symmetrical about the axis of the heater core 50 with the straight return potion 23 and an inner wall 35 of the flow separating wall 30 defining a funnel-shaped air guide for air which passes through the heater core into and through the electric heating device 40.

The outlet region 24 defines, with the straight region 22 of the said second wall portion, an outlet duct 25.

A first butterfly-type door 51 is disposed between the first extremity 31 of the flow separating wall 30 and the first wall portion 12. The first butterfly door has a central pivot 52 and two opposed shutter portions 53 dimensioned such that when the butterfly door 51 is in a first orientation the shutter portions abut respectively the first extremity 31 and the first wall portion 11. The first wall portion has a stop 54 for the first door. The two shutter portions are not diametrically opposed but instead are disposed at an angle of about 160° so as to provide an air guide effect when the first butterfly door is in its open position, as shown in FIG. 1.

Disposed between the flow directing region 33 of the flow separating wall 30 and the second wall portion 12 is a second butterfly door 61 having a central pivot 62 and two opposed shutter portions 63. The shutter portions 63 are likewise disposed at an angle of around 160°. The second butterfly door 61, as shown in FIG. 1 has a first orientation in which it substantially sealingly abuts the flow separating wall 30 and the second wall portion 12. The second wall portion 12 has a stop 64 for the second door. The doors have associated control means to rotate them each clockwise by substantially 90° to the position shown in FIG. 2. In these positions it will be seen that the obtuse angle defined by the two shutter portions 63 of the second door forms a flow guide for air, whereas the first door 51 is closed.

As will be understood by those skilled in the art, the device of the invention is a lateral system, in which the heater core is substantially aligned with the axis A. As shown in FIG. 1, when the first butterfly door is in the fully open position, an air flow 70 from the evaporator 16 has a generally smooth path between the inlet duct 10 and the outlet duct 25. In the heater area air passes smoothly into the input of the heater core 50, through the heater core 50 and then via the transition region of the space between the heater core and the parallel electric heating device, is concentrated into the electric heating device before passing out into the mixing space.

Figure 2:
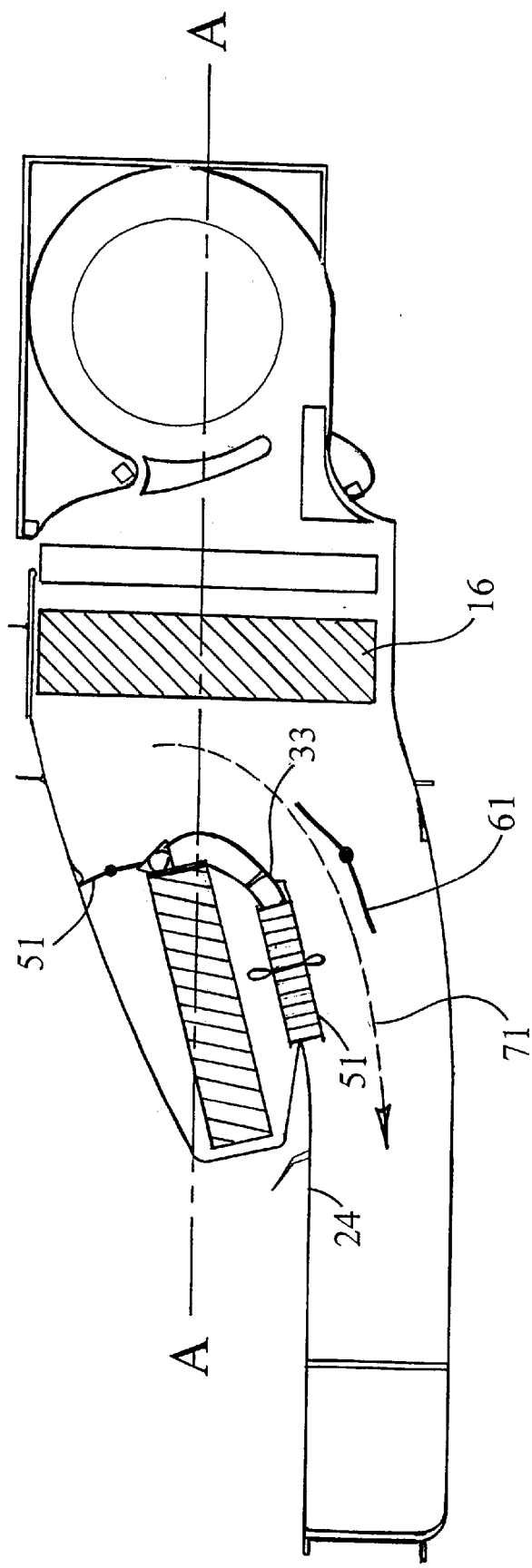
FIG. 2 shows a view similar to that of FIG. 1 but with the device in the fully closed position.

Referring now to FIG. 2, it will be seen that the first butterfly door 51 has been rotated by about 90° to abut the first wall portion 11 and also the first extremity 31 of the flow separating wall 30. The second butterfly door is rotated to the fully open position and provides a generally smooth flow 71 between the air inlet duct 10 and the outlet duct 25. It will be seen that the downstream face 41 of the electric heating device 40 is disposed so as to be generally flush with the mouth, thus it is collinear with the flow directing region 33 of the flow separating wall 30, and the outlet region 24. This ensures that no disturbance to air flow occurs due to additional turbulence and the like. The presence of the electric heating device 40 prevents the cool air in the air inlet duct from coming into contact with the heater core 50. Specifically, the heater core 50 provides a number of generally parallel passageways between its fins 42 and the spacing between these fins is small by comparison with the spacing between the downstream face 41 of the electric heating device and the downstream face 51 of the heater core 50. As a result, any turbulent effects in the spacing between the fins will not reach the heater core, thus effectively preventing pickup of heat from the heater core.

The particular embodiment shown has the electric heating device disposed parallel to the heater core. However it has been found that a deviation of plus or minus 15 degrees provides good flow properties.

The embodiment also uses butterfly doors, but other configurations such as shutters, flag doors, barrel doors or film doors can be used.

What is claimed is:

1. A vehicle heating device comprising an inlet duct, and first and second passageways, said first and second passageways extending laterally from said inlet duct to a common mixing zone, a heater core, said heater core being disposed in the first passageway, said heater core being substantially laterally disposed with respect to said inlet duct, said first passageway having a mouth defined by two opposing wall portions, said mouth entering the common mixing zone, an electric heater disposed across said mouth and spaced from said heater core, a first blend door disposed in said first passageway, and a second blend door disposed in said second passageway.

2. The vehicle heating device of claim 1 wherein said electric heater has a first face disposed proximate said heater core and a second face disposed remote from said heater core, said second face being substantially flush with said mouth and wherein an air flow in said second passage is substantially parallel to said second face.

3. The vehicle heating device of claim 1 and further comprising control devices for moving the blend doors between fully closed positions in which each blend door closes its respective passageway and fully opened positions in which each blend door is substantially aligned with the respective passageway.

4. The vehicle heating device of claim 3 wherein each blend door comprises two opposed wings mutually disposed at an obtuse angle to provide direction of air flow when the respective door is fully open.

5. The vehicle heating device of claim 1 further comprising a evaporator, said evaporator being disposed in said inlet duct to provide an air conditioning device.

6. The vehicle heating device of claim 1 further comprising a flow separating device disposed in said inlet duct whereby said inlet divides into said first and second passageways.

7. The vehicle heating device of claim 6 wherein an extremity of said flow separating device forms one of said wall portions defining said mouth.

8. The vehicle heating device of claim 1 wherein said electric heater is disposed substantially parallel to said heater core.

9. The vehicle heating device of claim 1 wherein said first blend door is rotatable about its central pivot and said second blend door is rotatable about its central pivot.

10. The vehicle heating device of claim 1 wherein each blend door is a shutter.

11. The vehicle heating device of claim 1 wherein each blend door is a barrel door.

12. The vehicle heating device of claim 1 wherein each blend door is a flag door.

13. The vehicle heating device of claim 1 wherein each blend door is a film door.

* * * * *